(12) United States Patent
Davis et al.

(10) Patent No.: US 11,713,713 B2
(45) Date of Patent: Aug. 1, 2023

(54) GAS TURBINE ENGINE FRONT CENTER BODY ARCHITECTURE

(71) Applicant: Raytheon Technologies Corporation, Farmington, CT (US)

(72) Inventors: Todd A. Davis, Tolland, CT (US); Brian P. Cigal, Windsor, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 525 days.

(21) Appl. No.: 16/836,001

(22) Filed: Mar. 31, 2020

(65) Prior Publication Data
US 2020/0284197 A1  Sep. 10, 2020

Related U.S. Application Data

(63) Continuation of application No. 13/860,774, filed on Apr. 11, 2013, now Pat. No. 10,605,167, which is a (Continued)

(51) Int. Cl.
*F02C 7/06* (2006.01)
*F01D 25/28* (2006.01)
(Continued)

(52) U.S. Cl.
CPC ............... *F02C 7/06* (2013.01); *F01D 15/12* (2013.01); *F01D 25/162* (2013.01); (Continued)

(58) Field of Classification Search
CPC ...... F02C 7/06; F02C 7/20; F02C 7/36; F02K 3/06; Y10T 29/49245; F05D 2230/60; (Continued)

(56) References Cited

U.S. PATENT DOCUMENTS 2,258,792 A  4/1941  New
2,936,655 A  5/1960  Peterson et al.
(Continued)

FOREIGN PATENT DOCUMENTS

EP  0791383  8/1997
EP  1114949  7/2001
(Continued)

OTHER PUBLICATIONS

Middleton, P. (1971). 614: VFW's jet feederliner. Flight International, Nov. 4, 1971. p. 725, 729-732.
(Continued)

*Primary Examiner* — Christopher Verdier
(74) *Attorney, Agent, or Firm* — Carlson, Gaskey & Olds, P.C.

(57) ABSTRACT

A gas turbine engine includes a fan that has fan blades wherein the fan delivers airflow to a bypass duct. A gearbox is defined along an engine axis. A low spool is arranged aft of the gearbox and coupled to drive the gearbox. A front center body assembly is defined around the engine axis. A flexible support supports the gearbox relative to the front center body assembly. A bearing package is mounted to the front center body assembly and the low spool. A front wall is mounted to the front center body assembly. The front wall is removable from the front center body assembly to access at least one of the gearbox or the bearing package. The low spool includes a low pressure compressor hub that provides a spline for engaging the bearing package.

30 Claims, 8 Drawing Sheets

Related U.S. Application Data continuation of application No. 13/732,647, filed on Jan. 2, 2013, now Pat. No. 8,911,204, which is a continuation of application No. 13/282,919, filed on Oct. 27, 2011, now Pat. No. 8,366,385, which is a continuation-in-part of application No. 13/087,579, filed on Apr. 15, 2011, now abandoned, and a continuation-in-part of application No. 13/275,286, filed on Oct. 17, 2011, now abandoned.

(60) Provisional application No. 61/789,224, filed on Mar. 15, 2013.

(51) Int. Cl.
   *F01D 25/16* (2006.01)
   *F01D 15/12* (2006.01)
   *F02K 3/06* (2006.01)
   *F02C 7/20* (2006.01)
   *F02C 7/36* (2006.01)

(52) U.S. Cl.
   CPC .............. *F01D 25/285* (2013.01); *F02C 7/20* (2013.01); *F02C 7/36* (2013.01); *F02K 3/06* (2013.01); *F05D 2230/60* (2013.01); *F05D 2230/70* (2013.01); *F05D 2230/72* (2013.01); *F05D 2230/80* (2013.01); *Y02T 50/60* (2013.01); *Y10T 29/49245* (2015.01)

(58) Field of Classification Search
   CPC .............. F05D 2230/72; F05D 2230/70; F05D 2230/80; F01D 15/12; F01D 25/16; F01D 25/162; F01D 25/285; B23P 6/002; B23P 6/005
   USPC ............... 415/189–190, 209.2–209.4, 214.1, 415/229–230, 122.1, 124.1; 416/174, 416/244 A, 245 R, 170 R; 60/798; 29/889.1, 402.03, 426.1
   See application file for complete search history.

(56) References Cited

U.S. PATENT DOCUMENTS

| | | | |
|---|---|---|---|
| 3,021,731 | A | 2/1962 | Stoeckicht |
| 3,194,487 | A | 7/1965 | Tyler et al. |
| 3,287,906 | A | 11/1966 | McCormick |
| 3,352,178 | A | 11/1967 | Lindgren et al. |
| 3,412,560 | A | 11/1968 | Gaubatz |
| 3,637,271 | A * | 1/1972 | Bayard ............... F01D 25/16 384/462 |
| 3,664,612 | A | 5/1972 | Skidmore et al. |
| 3,747,343 | A | 7/1973 | Rosen |
| 3,754,484 | A | 8/1973 | Roberts |
| 3,765,623 | A | 10/1973 | Donelson et al. |
| 3,820,719 | A | 6/1974 | Clark |
| 3,843,277 | A | 10/1974 | Ehrich |
| 3,892,358 | A | 7/1975 | Gisslen |
| 3,909,085 | A * | 9/1975 | Wilkinson ............ F16C 25/083 384/517 |
| 3,932,058 | A | 1/1976 | Harner et al. |
| 3,935,558 | A | 1/1976 | Miller et al. |
| 3,988,889 | A | 11/1976 | Chamay et al. |
| 4,130,872 | A | 12/1978 | Harloff |
| 4,132,069 | A | 1/1979 | Adamson et al. |
| 4,220,171 | A | 9/1980 | Ruehr |
| 4,240,250 | A | 12/1980 | Harris |
| 4,284,174 | A | 8/1981 | Salvana et al. |
| 4,289,360 | A | 9/1981 | Zirin |
| 4,478,551 | A | 10/1984 | Honeycutt, Jr. et al. |
| 4,649,114 | A | 3/1987 | Miltenburger et al. |
| 4,683,714 | A | 8/1987 | Thebert |
| 4,696,156 | A | 9/1987 | Burr et al. |
| 4,722,357 | A | 2/1988 | Wynosky |
| 4,744,214 | A | 5/1988 | Monsarrat |
| 4,804,288 | A * | 2/1989 | Tiernan, Jr. ............... F16D 1/02 403/337 |
| 4,979,362 | A | 12/1990 | Vershure, Jr. |
| 5,058,617 | A | 10/1991 | Stockman et al. |
| 5,102,379 | A | 4/1992 | Pagluica et al. |
| 5,141,400 | A | 8/1992 | Murphy et al. |
| 5,161,940 | A | 11/1992 | Newland |
| 5,317,877 | A | 6/1994 | Stuart |
| 5,361,580 | A | 11/1994 | Ciokajlo et al. |
| 5,433,584 | A | 7/1995 | Amin et al. |
| 5,433,674 | A | 7/1995 | Sheridan |
| 5,447,411 | A | 9/1995 | Curley et al. |
| 5,466,198 | A | 11/1995 | McKibbin et al. |
| 5,524,847 | A | 6/1996 | Brodell et al. |
| 5,622,438 | A | 4/1997 | Walsh et al. |
| 5,634,767 | A | 6/1997 | Dawson |
| 5,677,060 | A | 10/1997 | Terentieva et al. |
| 5,778,659 | A | 7/1998 | Duesler et al. |
| 5,857,836 | A | 1/1999 | Stickler et al. |
| 5,915,917 | A | 6/1999 | Eveker et al. |
| 5,975,841 | A | 11/1999 | Lindemuth et al. |
| 5,985,470 | A | 11/1999 | Spitsberg et al. |
| 6,109,022 | A | 8/2000 | Allen et al. |
| 6,223,616 | B1 | 5/2001 | Sheridan |
| 6,315,815 | B1 | 11/2001 | Spadaccini et al. |
| 6,318,070 | B1 | 11/2001 | Rey et al. |
| 6,387,456 | B1 | 5/2002 | Eaton, Jr. et al. |
| 6,517,341 | B1 | 2/2003 | Brun et al. |
| 6,607,165 | B1 | 8/2003 | Manteiga et al. |
| 6,709,492 | B1 | 3/2004 | Spadaccini et al. |
| 6,814,541 | B2 | 11/2004 | Evans et al. |
| 6,883,303 | B1 | 4/2005 | Seda |
| 7,021,042 | B2 | 4/2006 | Law |
| 7,219,490 | B2 | 1/2007 | Dev |
| 7,328,580 | B2 | 2/2008 | Lee et al. |
| 7,374,403 | B2 | 5/2008 | Decker et al. |
| 7,591,754 | B2 | 9/2009 | Duong et al. |
| 7,632,064 | B2 | 12/2009 | Somanath |
| 7,662,059 | B2 | 2/2010 | McCune |
| 7,765,787 | B2 | 8/2010 | Eleftheriou et al. |
| 7,797,922 | B2 | 9/2010 | Eleftheriou et al. |
| 7,806,651 | B2 | 10/2010 | Kennepohl et al. |
| 7,824,305 | B2 | 11/2010 | Duong et al. |
| 7,828,682 | B2 | 11/2010 | Smook |
| 7,926,260 | B2 | 4/2011 | Sheridan et al. |
| 7,997,868 | B1 | 8/2011 | Liang et al. |
| 8,205,432 | B2 | 6/2012 | Sheridan |
| 8,241,172 | B2 | 8/2012 | Lahtinen et al. |
| 8,366,385 | B2 * | 2/2013 | Davis .................... F01D 25/285 415/230 |
| 8,585,538 | B2 | 11/2013 | Sheridan et al. |
| 8,911,204 | B2 * | 12/2014 | Davis ..................... F02C 3/107 415/230 |
| 2002/0067870 | A1 | 6/2002 | Ommundson et al. |
| 2006/0130456 | A1 | 6/2006 | Suciu et al. |
| 2006/0228206 | A1 | 10/2006 | Decker |
| 2007/0022738 | A1 | 2/2007 | Norris et al. |
| 2007/0084185 | A1 * | 4/2007 | Moniz .................... F01D 25/18 60/226.1 |
| 2007/0104574 | A1 | 5/2007 | Ashley et al. |
| 2008/0003096 | A1 | 1/2008 | Kohli et al. |
| 2008/0006018 | A1 | 1/2008 | Sheridan et al. |
| 2008/0014084 | A1 | 1/2008 | Eleftheriou et al. |
| 2008/0098713 | A1 | 5/2008 | Orlando et al. |
| 2008/0116009 | A1 | 5/2008 | Sheridan et al. |
| 2008/0317588 | A1 | 12/2008 | Grabowski et al. |
| 2009/0056343 | A1 | 3/2009 | Suciu et al. |
| 2009/0081039 | A1 | 3/2009 | McCune |
| 2009/0304518 | A1 | 12/2009 | Kodama et al. |
| 2009/0314881 | A1 | 12/2009 | Suciu et al. |
| 2010/0105516 | A1 | 4/2010 | Sheridan |
| 2010/0132369 | A1 | 6/2010 | Durocher et al. |
| 2010/0148396 | A1 | 6/2010 | Xie et al. |
| 2010/0150702 | A1 | 6/2010 | Sheridan et al. |
| 2010/0212281 | A1 | 8/2010 | Sheridan |
| 2010/0218483 | A1 | 9/2010 | Smith |
| 2010/0331139 | A1 | 12/2010 | McCune |
| 2011/0130246 | A1 | 6/2011 | McCune |

(56) References Cited

U.S. PATENT DOCUMENTS

| | | | |
|---|---|---|---|
| 2011/0159797 | A1 | 6/2011 | Beltman et al. |
| 2011/0286836 | A1 | 11/2011 | Davis |
| 2011/0293423 | A1 | 12/2011 | Bunker et al. |
| 2012/0124964 | A1 | 5/2012 | Hasel et al. |
| 2012/0260669 | A1 | 10/2012 | Davis et al. |
| 2012/0263578 | A1* | 10/2012 | Davis ............ F01D 25/16 29/889.1 |

FOREIGN PATENT DOCUMENTS

| | | | |
|---|---|---|---|
| EP | 1142850 | | 10/2001 |
| EP | 1890054 | | 5/2010 |
| EP | 2390472 | A2 | 11/2011 |
| EP | 2511484 | | 10/2012 |
| EP | 1876338 | B1 | 10/2013 |
| GB | 926947 | * | 5/1963 ........ F01D 25/162 |
| GB | 1516041 | | 6/1978 |
| GB | 2041090 | | 9/1980 |
| GB | 2320527 | | 6/1998 |
| GB | 2426792 | | 12/2006 |
| WO | 2007038674 | | 4/2007 |

OTHER PUBLICATIONS

Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

Spadaccini, L.J., and Huang, H. (2002). On-line fuel deoxygenation for coke suppression. ASME, Jun. 2002. pp. 1-7.

Darrah, S. (1987). Jet fuel deoxygenation. Interim Report for Period Mar. 1987-Jul. 1988. pp. 1-22.

Bucknell, R.L. (1973). Influence of fuels and lubricants on turbine engine design and performance, fuel and lubricant analyses. Final Technical Report, Mar. 1971-Mar. 1973. pp. 1-252.

Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.

Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Edkins, D.P., Hirschkron, R., and Lee, R. (1972). TF34 turbofan quiet engine study. Final Report prepared for NASA. NASA-CR-120914. Jan. 1, 1972. pp. 1-99.

Waters, M.H. and Schairer, E.T. (1977). Analysis of turbofan propulsion system weight and dimensions. NASA Technical Memorandum. Jan. 1977. pp. 1-65.

Meyer, A.G. (1988). Transmission development of TEXTRON Lycoming's geared fan engine. Technical Paper. Oct. 1988. pp. 1-12.

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Gates, D. Bombardier flies at higher market. Seattle Times. Jul. 13, 2008. pp. C6.

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

Trembley, JR., H.F. (1977). Determination of effects of ambient conditions on aircraft engine emissions. ALF 502 combustor rig testing and engine verification test. Prepared for Environmental Protection Agency. Sep. 1977. pp. 1-256.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

Mccune, M.E. (1993). Initial test results of 40,000 horsepower fan drive gear system for advanced ducted propulsion systems. AIAA 29th Joint Conference and Exhibit. Jun. 28-30, 1993. pp. 1-10.

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

Drago, R.J. (1974). Heavy-lift helicopter brings up drive ideas. Power Transmission Design. Mar. 1987. pp. 1-15.

Krantz, T.L. (1990). Experimental and analytical evaluation of efficiency of helicopter planetary stage. NASA Technical Paper. Nov. 1990. pp. 1-19.

Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.

Thulin, R.D., Howe, D.C., and Singer, I.D. (1982). Energy efficient engine: High pressure turbine detailed design report. Prepared for NASA. NASA CR-165608. pp. 1-178.

Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Gray, D.E. (1978). Energy efficient engine preliminary design and integration studies. Prepared for NASA. NASA CR-135396. Nov. 1978. pp. 1-366.

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.

Mcardle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.

Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.

Salemme, C.T. and Murphy, G.C. (1979). Metal spar/superhybrid shell composite fan blades. Prepared for NASA. NASA-CR-159594. Aug. 1979. pp. 1-127.

Anderson, R.D. (1985). Advanced Propfan Engine Technology (APET) definition study, single and counter-rotation gearbox/pitch change mechanism design. NASA CR-168115. Jul. 1, 1985. pp 1-289.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.

Gliebe, P.R., Ho, P.Y., and Mani, R. (1995). UHB engine fan and broadband noise reduction study. NASA CR-198357. Jun. 1995. pp. 1-48.

(56) References Cited

OTHER PUBLICATIONS

Holcombe, V. (2003). Aero-Propulsion Technology (APT) task V low noise ADP engine definition study. NASA CR-2003-212521. Oct. 1, 2003. pp. 1-73.
Sutliff, D. (2005). Rotating rake turbofan duct mode measurement system. NASA TM-2005-213828. Oct. 1, 2005. pp. 1-34.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
NASA Conference Publication. (1978). CTOL transport technology. NASA-CP-2036-PT-1. Jun. 1, 1978. pp. 1-531.
Davis, D.G.M. (1973). Variable-pitch fans: Progress in Britain. Flight International. Apr. 19, 1973. pp. 615-617.
Levintan, R.M. (1975). Q-Fan demonstrator engine. Journal of Aircraft. vol. 12( 8). Aug. 1975. pp. 658-663.
Technical Report. (1975). Quiet Clean Short-haul Experimental Engine (QCSEE) UTW fan preliminary design. NASA-CR-134842. Feb. 1, 1975. pp 1-98.
Aerospace Information Report. (2008). Advanced ducted propulsor in-flight thrust determination. SAE International AIR5450. Aug. 2008. p. 1-392.
Daggett, D.L., Brown, S.T., and Kawai, R.T. (2003). Ultra-efficient engine diameter study. NASA/CR-2003-212309. May 2003. pp. 1-52.
Extended European Search Report for EP Application No. 20195100.1 dated Jan. 20, 2021.
Third Party Observations filed in EP Application No. 12164348.0 on Mar. 27, 2015.
Bucknell, R.L. (1973). Influence of fuels and lubricants on turbine engine design and performance, fuel and lubircant analyses. Final Technical Report, Mar. 1971-Mar. 1973. pp. 1-252.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
Zamboni, G. and Xu, L. (2009). Fan root aerodynamics for large bypass gas turbine engines: Influence on the engine performance and 3D design. Proceedingsof ASME Turbo Expo 2009: Power for Land, Sea and Air. Jun. 3-12, 2009, Orlando, Florida, USA. pp. 1-12.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Dr. Magdy Attia. In re U.S. Pat. No. 8,313,280. Executed Oct. 21, 2016. pp. 1-88.
Daly, M. Ed. (2010). Jane's Aero-Engine. Issue Twenty-seven. Mar. 2010. p. 633-636.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003.. p. 1-6 and Appendices.
Zhao, J.C. and Westbrook, J.H. (2003). Ultrahigh-temperature materials for jet engines. MRS Bulletin. vol. 28(9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Bunker, R.S. (2005). A review of shaped hole turbine film-cooling technology. Journal of Heat Transfer vol. 127. Apr. 2005. pp. 441-453.
Winn, A. (Ed). (1990). Wide Chord Fan Club. Flight International, 4217(137). May 23-29, 1990. pp. 34-38.
Parker, R.G. and Lin, J. (2001). Modeling, modal properties, and mesh stiffness variation instabilities of planetary gears. Prepared for NASA. NASA/CR-2001-210939. May 2001. pp. 1-111.
Honeywell Learjet 31 and 35/36 TFE731-2 to 2C Engine Upgrade Program. Sep. 2005. pp. 1-4.
Honeywell Sabreliner 65 TFE731-3 to—3D Engine Upgrade Program. Oct. 2005. pp. 1-4.
U.S. Department of Transportation: Federal Aviation Administration Type Certificate Data Sheet No. E6WE. Dated May 9, 2000. p. 1-9.
Ahmad, F. and Mizramoghadam, A.V. (1999). Single v. two stage high pressure turbine design of modern aero engines. ASME. Presented at the International Gas Turbine & Aeroengine Congress & Exhibition. Indianapolis, Indiana. Jun. 7-10, 1999. pp. 1-9.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
About GasTurb. Retrieved Jun. 26, 2018 from: http://gasturb.de/about-gasturb.html.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Singh, A. (2005). Application of a system level model to study the planetary load sharing behavior. Jounal of Mechanical Design. vol. 127. May 2005. pp. 469-476.
Smith-Boyd, L. and Pike, J. (1986). Expansion of epicyclic gear dynamic analysis program. Prepared for NASA. NASA CR-179563. Aug. 1986. pp. 1-98.
Wikipedia. Torsion spring. Retreived Jun. 29, 2018 from: https://en.wikipedia.org/wiki/Torsion_spring.
Daly, M. Ed. (2007). Jane's Aero-Engine. Issue Twenty-three. Mar. 2008. p. 707-12.
Wikipedia. Stiffness. Retrieved Jun. 28, 2018 from: https://en.wikipedia.org/wiki/Stiffness.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Gray, D.E. and Gardner, W.B. (1983). Energy efficient engine program technology benefit/cost study—vol. 2. NASA CR-174766. Oct. 1983. pp. 1-118.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Heidelberg, L.J., and Hall, D.G. (1992). Acoustic mode measurements in the inlet of a model turbofan using a continuously rotating rake. NASA-TM-105989. Prepared forthe 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Howe, D.C, and Wynosky, T.A. (1985). Energy efficient engine program advanced turbofan nacelle definition study. NASA-CR-174942. May 1985. pp. 1-60.
Howe, D.C, and Wynosky, T.A. (1985). Energy efficient engine program advanced turbofan nacelle definition study. NASA-CR-174942. May 1985. University of Washington dated Dec. 13, 1990. pp. 1-14.
Wie, Y.S., Collier, F.S., Wagner, R.D, Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.

(56) References Cited

OTHER PUBLICATIONS

Johnston, R.P., Hirschkron, R. Koch, C.C., Neitzel, R.E., and Vinson, P.W. (1978). Energy efficient engine: Preliminary design and integration study-final report. NASA CR-135444. Sep. 1978. pp. 1-401.

Johnston, R.P. and Hemsworth, M.C. (1978). Energy efficient engine preliminary design and integration studies. Jun. 1, 1978. pp. 1-28.

Awker, R.W. (1986). Evaluation of propfan propulsion applied to general aviation. NASA CR-175020. Mar. 1, 1986. pp. 1-140.

Howe, D.C. and Wynosky, T.A. (1985). Energy efficient engine program advanced turbofan nacelle definition study. NASA CR-174942. May 1, 1985. pp. 174.

Singh, B. (1986). Small engine component technology (SECT) study. NASA CR-175079. Mar. 1, 1986. pp. 1-102.

Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp 1-187.

European Search Report and Written Opinion for European Application No. EP 12 16 4348 completed on Nov. 6, 2013.

Extended European Search Report for European Application No. 12188417.5 dated Oct. 21, 2016.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Zalud, T. (1998). Gears put a new spin on turbofan performance. Machine Design, 70(20), p. 104.

Kurzke, J. (2008). Preliminary Design, Aero engine design: From state of the art turbofans towards innovative architectures. pp. 1-72.

Han, J., Dutta, S., and Ekkad, S.V. (2000). Gas turbine heat transfer and cooling technology. New York, NY: Taylor & Francis, pp. 1-25, 129-157, and 160-249.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.

Declaration of John Eaton, Ph.D. In re United States Patent Application 8,869,568. Executed Mar. 28, 2016. pp. 1-87.

Declaration of Reza Abhari. In re United States Patent Application 8,695,920. Executed Nov. 30. pp. 1-67.

Declaration of Reza Abhari. In re United States Patent Application 8,448,895. Executed Nov. 28. pp. 1-81.

Declaration of Reza Abhari. In re United States Patent Application 8,695,920, claims 1-4, 7-14,17 and 19. Executed Nov. 29. pp. 1-102.

Declaration of Dr. Magdy Attia. In re United States Patent Application 8,313,280. Executed Oct. 21, 2016. pp. 1-88.

Lord, W.K., Macmartin, D.G., and Tillman, T.G. (2000). Flow control opportunities in gas turbine engines. American Institute of Aeronautics and Astronautics, pp. 1-15.

Roux, E. (2007). Turbofan and turbojet engines database handbook. Editions Elodie Roux. Blagnac: France. pp. 1-595.

Cramoisi, G. Ed. (2012). Death in the Potomac: The crash of Air Florida Flight 90. Air Crash Investigations. Accident Report NTSB/AAR-82-8. p. 45-47.

Norton, M. and Karczub, D. (2003). Fundamentals of noise and vibration analysis for engineers. Press Syndicate of the University of Cambridge. New York: New York. p. 524.

Vasudevan, A.K. and Petrovic, J.J. (1992). A comparative overview of molybedenum disilicide composites. Materials Science and Engineering, A155, 1992. pp. 1-17.

Clarke, D.R. and Levi, C.G. (2003). Materials design for the next generation thermal barrier coatings. Annual. Rev. Mater. Res. vol. 33. 2003. pp. 383-417.

Lee, K.N. (2000). Current status of environmental barrier coatings for Si-Based ceramics. Surface and Coatings Technology 133-134, 2000. pp. 1-7.

Bornstein, N. (1993). Oxidation of advanced intermetallic compounds. Journal de Physique IV, 1993, 03 (C9), pp. C9-367-C9-373.

Krenkel, W., Naslain, R., and Schneider, H. Eds. (2001). High temperature ceramic matrix composites pp. 224-229. Weinheim, DE: Wiley-VCH Verlag GmbH.

Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.

Shah, D.M. (1992). MoSi2 and other silicides as high temperature structural materials. Superalloys 1992. The Minerals, Metals, & Materials Society. pp. 409-422.

Jacobson, N.S. (1993). Corrosion of silicon-based ceramics in combustion environments. J. Am. Ceram. Soc. 76(1). pp. 3-28.

Jorgensen, P.J., Wadsworth, M.E., and Cutler, I.B. (1961). Effects of water vapor on oxidation of silicon carbide. J. Am. Ceram. Soc. 44(6). pp. 248-261.

Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.

Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.

Jeng, Y.-L., Lavernia, E.J. (1994). Processing of molybdenum disilicide. J. of Mat. Sci. vol. 29. 1994. pp. 2557-2571.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.

Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.

Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Leckie, F.A. and Dal Bello, D.J. (2009). Strength and stiffness of engineering systems. Mechanical Engineering Series. Springer. pp. 1-3.

El-Sayad, A.F. (2008). Aircraft propulsion and gas turbine engines. Boca Raton, FL: CRC Press. pp. 215-219 and 855-60.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Mcmillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Hess, C. (1998). Pratt & Whitney develops geared turbofan. Flug Revue 43(7). Oct. 1998.

Brennan, P.J. and Kroliczek, E.J. (1979). Heat pipe design handbook. Prepared for National Aeronautics and Space Administration by B & K Engineering, Inc. Jun. 1979. pp. 1-348.

Knip, Jr., G. (1987). Analysis of an advanced technology subsonic turbofan incorporating revolutionary materials. NASA Technical Memorandum. May 1987. pp. 1-23.

Ramsden, J.M. (Ed) (1978). The new European airliner. Flight International, 113(3590). Jan. 7, 1978. pp. 39-43.

(56) References Cited

OTHER PUBLICATIONS

Langston, L. and Faghri, A. Heat pipe turbine vane cooling. Prepared for Advanced Turbine Systems Annual Program Review. Morgantown, West Virginia. Oct. 17-19, 1995. pp. 3-9.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Fledderjohn, K.R. (1983). The IFE731-5: Evolution of a decade of business jet service. SAE Technical Paper Series. Business Aircraft Meeting & Exposition. Wichita, Kansas. Apr. 12-15, 1983. pp 1-12.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

Final Office Action from U.S. Appl. No. 13/732,647, dated Aug. 19, 2014.

* cited by examiner

GAS TURBINE ENGINE FRONT CENTER BODY ARCHITECTURE

CROSS REFERENCE TO RELATED APPLICATIONS

The present disclosure is a continuation of U.S. patent application Ser. No. 13/860,774, filed Apr. 11, 2013, now granted U.S. Pat. No. 10,605,167 granted Mar. 31, 2020, which claims benefit of U.S. Provisional Application No. 61/789,224 filed Mar. 15, 2013 and is also a continuation of application Ser. No. 13/732,647, filed Jan. 2, 2013, now granted U.S. Pat. No. 8,911,204 granted Dec. 16, 2014, which is a continuation of U.S. patent application Ser. No. 13/282,919, filed on Oct. 27, 2011, now granted U.S. Pat. No. 8,366,385 granted Feb. 5, 2013, which is a continuation-in-part application of U.S. patent application Ser. No. 13/087,579, filed 15 Apr. 2011, now abandoned and of U.S. patent application Ser. No. 13/275,286, filed 17 Oct. 2011, now abandoned.

BACKGROUND

The present disclosure relates to a gas turbine engine, and in particular, to a case structure therefor.

Gas turbine engines typically include one or more rotor shafts that transfer power and rotary motion from a turbine section to a compressor section and fan section. The rotor shafts are supported within an engine static structure which is typically constructed of modules with individual case sections which are joined together at bolted flanges. The flanges form a joint capable of withstanding the variety of loads transmitted through the engine static structure. An ongoing issue for gas turbine engines is the ease and speed at which they can be serviced.

SUMMARY

In one exemplary embodiment, a method for servicing a gas turbine engine includes disassembling a bearing compartment, providing access from a forward side of the gas turbine engine to a gearbox contained within said bearing compartment. The gas turbine engine provides a core flow path that extends from the forward side aftward in a core flow direction. The method includes servicing a component located within the bearing compartment.

In a further embodiment of any of the above, disassembling the bearing compartment includes disassembling a front wall from a front center body support.

In a further embodiment of any of the above, the method includes providing access from the forward side to a flex support mounted within the front center body support. The flex support is mounted to the gearbox.

In a further embodiment of any of the above, the method includes disassembling a bearing package from the front center body support.

In a further embodiment of any of the above, the method includes disassembling the front wall from an output shaft driven by the gearbox.

In a further embodiment of any of the above, the step of disassembling includes removing as a module the gearbox by displacing the gearbox forward and away from said bearing compartment and a low spool.

In a further embodiment of any of the above, the component servicing step includes servicing one of the gearbox, a bearing package and a seal package.

In another exemplary embodiment, a method for servicing a gas turbine engine includes providing access from a forward side of a front center body assembly to a gearbox driven by a low spool, and servicing a component located within a bearing compartment aft of the front center body assembly.

In a further embodiment of any of the above, the method includes disassembling a fan mounted to the gearbox.

In a further embodiment of any of the above, the method includes removing first fasteners located within the forward side of the front center body assembly to disassemble a front wall from a front center body support of the front center body assembly.

In a further embodiment of any of the above, the disassembling step includes removing a fan hub from an output shaft coupled to the gearbox. The fasteners removing step is performed subsequent to the fan hub removing step.

In a further embodiment of any of the above, the forward side faces a fan.

In a further embodiment of any of the above, the access providing step includes removing as a module the gearbox by displacing the gearbox forward and away from said bearing compartment and said low spool thereby exposing the component. The component servicing step includes servicing one of a bearing package and a seal package.

In another exemplary embodiment, a gas turbine engine includes a gearbox defined along an engine axis. A low spool is arranged aft of the gearbox and is operable to drive said gearbox. A front center body support is defined around the engine axis. A bearing package is mounted to the front center body support and the low spool. A seal package is located aft of the bearing package. A front wall is mounted to the front center body support. The front wall is removable from the front center body support to access at least one of the gearbox, the bearing package and the seal package.

In a further embodiment of any of the above, the front center body support is defined about an engine longitudinal axis.

In a further embodiment of any of the above, the seal package is mounted to the front center body support.

In a further embodiment of any of the above, the front center body support includes a flange which abuts a flange of the front wall.

In a further embodiment of any of the above, the gas turbine engine includes fasteners, which attach the flange of the front wall to the flange of the front center body support.

In a further embodiment of any of the above, the fasteners are accessible from a forward side of the gas turbine engine.

In a further embodiment of any of the above, the front wall supports a bearing structure to support an output shaft driven by the gearbox. The output shaft is operable to drive a fan.

In a further embodiment of any of the above, the gearbox drives a fan section at a speed different than a speed of the low speed spool.

In a further embodiment of any of the above, the front center body support provides a unitary component with a front center body section having a vane arranged in an annular core path and that at least partially defines a core flow path.

In a further embodiment of any of the above, the front center body support and the front center body section are integral with one another.

In a further embodiment of any of the above, the front center body support and the front center body section are welded to one another.

In a further embodiment of any of the above, the gas turbine engine includes a coupling shaft interconnecting and splined to each of the gearbox and the coupling shaft section.

In a further embodiment of any of the above, the low spool includes a low pressure compressor hub providing a spline engageable with the bearing package. The seal package is mounted to the low pressure compressor hub.

In one exemplary embodiment, a gas turbine engine is configured to include a propulsor section having a fan drive geared architecture. The engine includes a gas generator section that includes a compressor section having a first rotor rotationally mounted to a first spool. Further included is a bearing package rotationally supporting the first spool. The bearing package supports the first spool during at least one of (1) a period prior to installation of the fan drive geared architecture into the engine and (2) a period after removal of the fan drive geared architecture from the engine.

In a further embodiment of any of the above, the first spool is a low spool of the engine.

In a further embodiment of any of the above, the fan drive geared architecture drives a fan section at a speed different than a speed of the low spool.

In a further embodiment of any of the above, a front center body support is defined around an engine longitudinal axis.

In a further embodiment of any of the above, the bearing package is mounted to the front center body support and the low spool.

In a further embodiment of any of the above, an engine static structure is included.

In a further embodiment of any of the above, the bearing package is adapted for rotationally supporting the first spool against the static structure.

Another exemplary embodiment includes a method of supporting a first rotor of a gas turbine engine. The engine is configured to include a propulsor section having a fan drive geared architecture. The engine further includes a gas generator section that includes a compressor section having a first rotor rotationally mounted to a first spool, an engine static structure, and a bearing package adapted for rotationally supporting the first spool against the engine static structure. The method includes supporting the first rotor with the bearing package during at least one of (1) a period prior to installation of the fan drive geared architecture into the engine and (2) a period after removal of the fan drive geared architecture from the engine.

In a further embodiment of any of the above, the compressor section includes a low pressure compressor.

In a further embodiment of any of the above, the bearing package supports the first rotor during each of (1) before the fan drive geared architecture into the engine and (2) after the fan drive geared architecture is removed from the engine.

In a further embodiment of any of the above, the fan drive geared architecture includes a gearbox.

In a further embodiment of any of the above, the bearing package supports a low rotor of the engine.

In a further embodiment of any of the above, the geared architecture is serviced while removed from the engine.

Another exemplary embodiment of a method of partially disassembling a gas turbine engine. The engine includes a propulsor section having a fan drive geared architecture, a gas generator section that includes a compressor section having a first rotor rotationally mounted to a first spool, an engine static structure, and a bearing package adapted for rotationally supporting the first spool relative to the static structure. The method includes removing the propulsor section without otherwise supporting the first rotor, whereby the bearing package disposed within the engine supports the first rotor.

In a further embodiment of any of the above, the compressor section includes a low pressure compressor.

In a further embodiment of any of the above, the bearing package is provided in a bearing compartment of the engine.

In a further embodiment of any of the above, the geared architecture includes a gearbox.

In a further embodiment of any of the above, the first rotor is the low rotor of the engine.

In a further embodiment of any of the above, the geared architecture is serviced while removed from the engine.

In a further embodiment of any of the above, the bearing package is adapted for rotationally supporting the first spool against the static structure.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
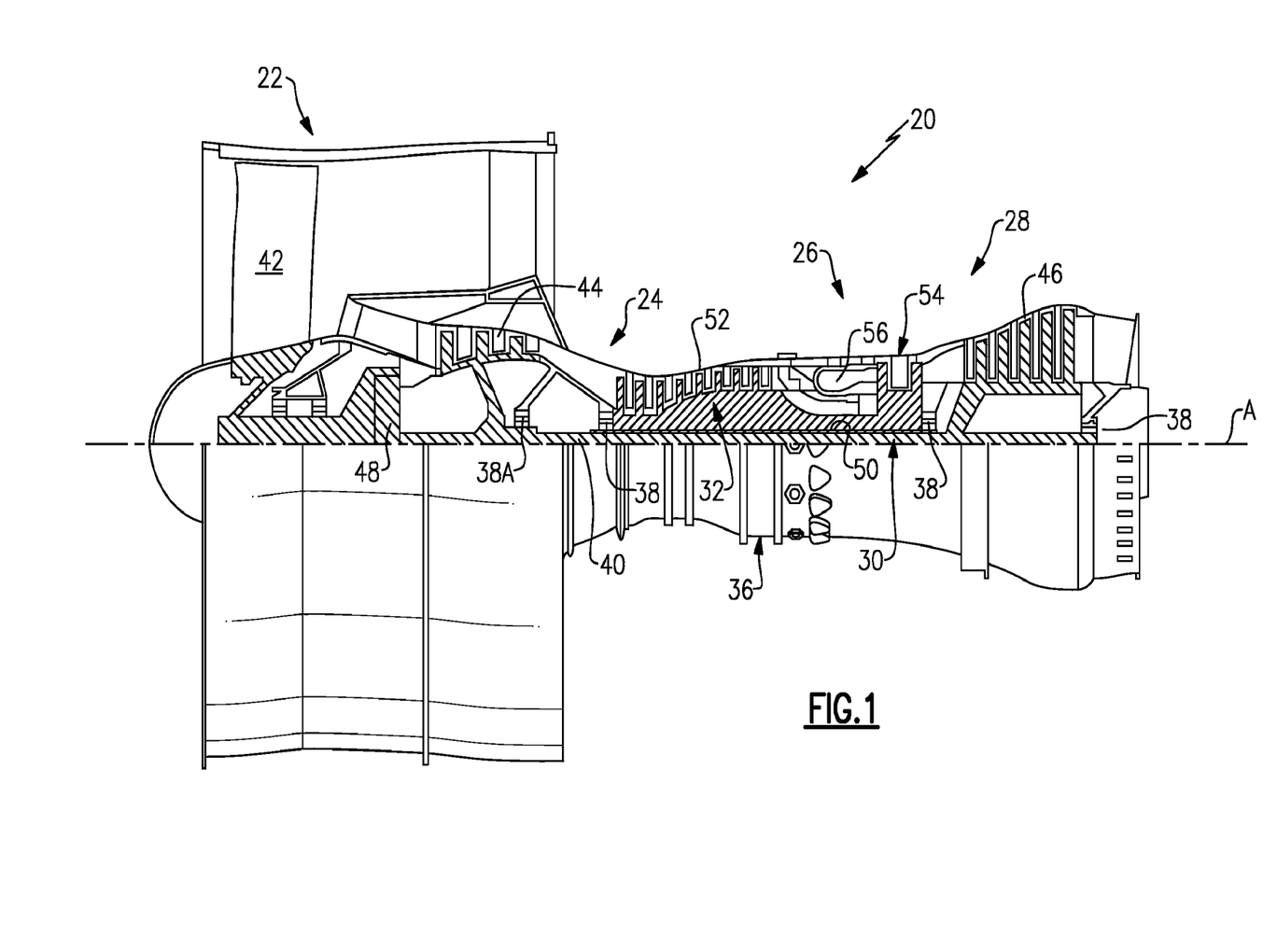
FIG. 1 is a schematic cross-section of an embodiment of a gas turbine engine.

FIG. 1 schematically illustrates a gas turbine engine 20. The gas turbine engine 20 is disclosed herein as a two-spool turbofan that generally incorporates a propulsor section that includes a fan section 22, and a gas generator section that includes a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbo gas turbine engine in the disclosed non-limiting embodiment, it should be understood that the concepts described herein are not limited to use with turbofans as the teachings may be applied to other types of turbine engines.

The engine 20 generally includes a low spool 30 and a high spool 32 mounted for rotation about an engine central longitudinal axis A relative to an engine static structure 36 via several bearing supports 38. The low spool 30 generally includes an inner shaft 40 that interconnects a fan 42, a low pressure compressor 44 and a low pressure turbine 46. The inner shaft 40 drives the fan 42 through a geared architecture 48 to drive the fan 42 at a lower speed than the low spool 30. For purposes of relating to the disclosed embodiments, the geared architecture is considered part of the propulsor section. The high spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel and burned in the combustor 56, then expanded over the high pressure turbine 54 and low pressure turbine 46. The turbines 54, 46 rotationally drive the respective low spool 30 and high spool 32 in response to the expansion.

The main engine shafts 40, 50 are supported at a plurality of points by the bearing system 38 within the static structure 36. In one non-limiting embodiment, bearing system 38 includes a #2 bearing support 38A located within the compressor section 24.

Figure 2:
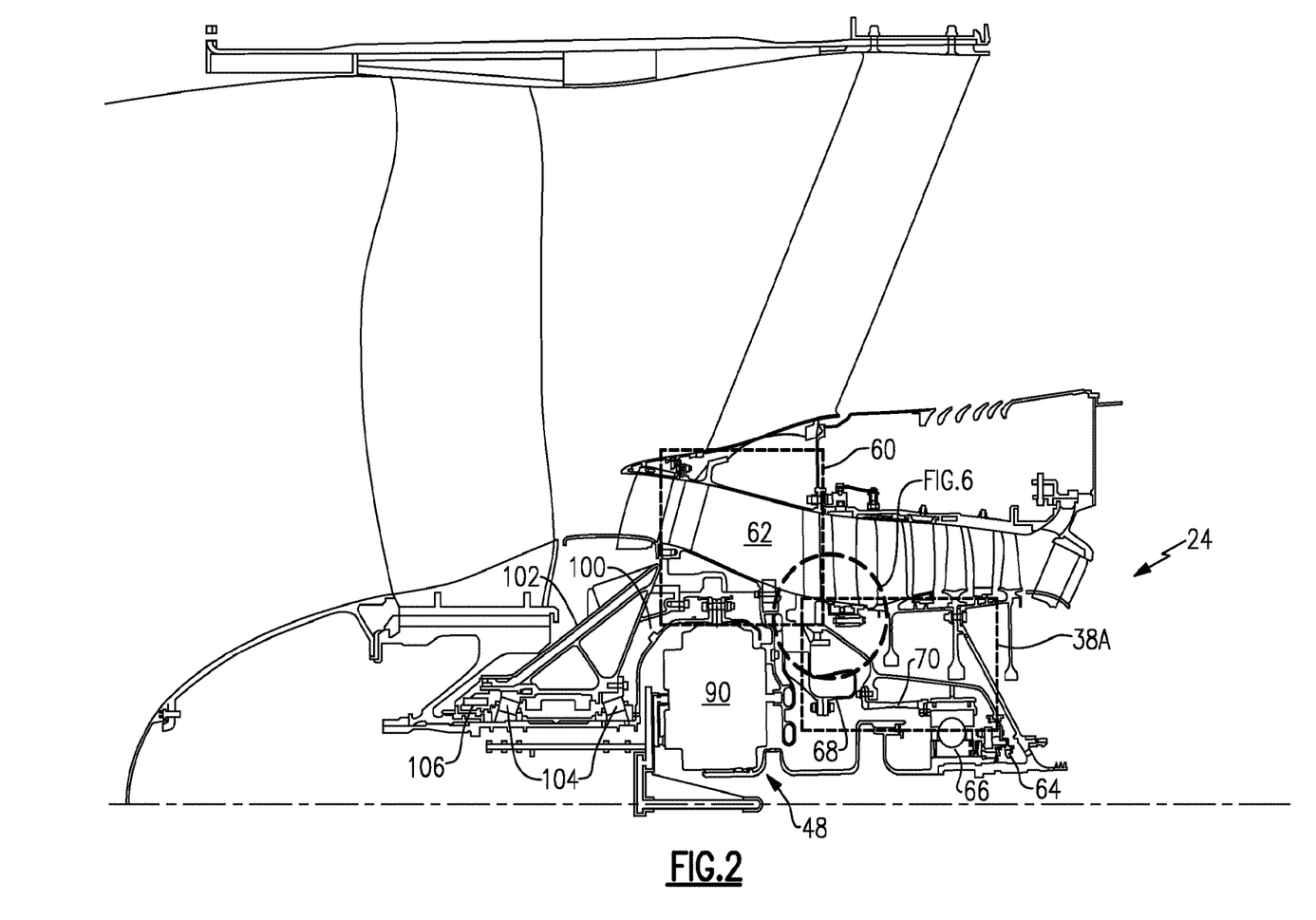
FIG. 2 is an enlarged cross-section of a portion of the gas turbine engine which illustrates a front center body assembly.

With reference to FIG. 2, the engine static structure 36 proximate the compressor section 24 includes a front center body assembly 60 adjacent a #2 bearing support 38A. The front center body assembly 60 generally includes a front center body support 62. The #2 bearing support 38A generally includes a seal package 64, a bearing package 66, a flex support 68 and a centering spring 70. The front center body assembly 60 defines a portion of a core flow through the gas turbine engine 20 and an outlet of the portion of the core flow path that is upstream of an inlet to the low pressure compressor 44 of the compressor section 24.

Figure 3:
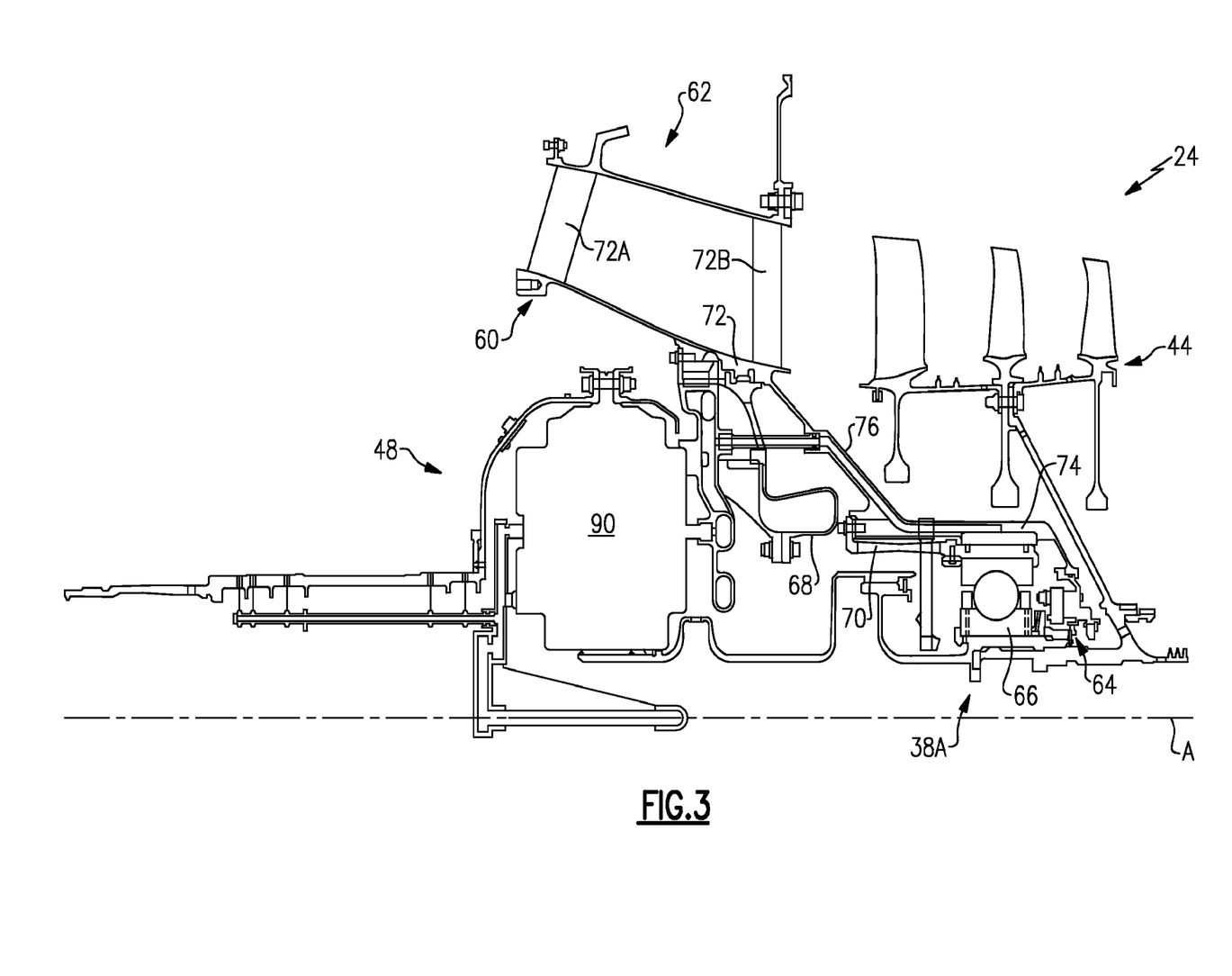
FIG. 3 is an enlarged cross-section of the geared architecture of the gas turbine engine.
Figure 4:
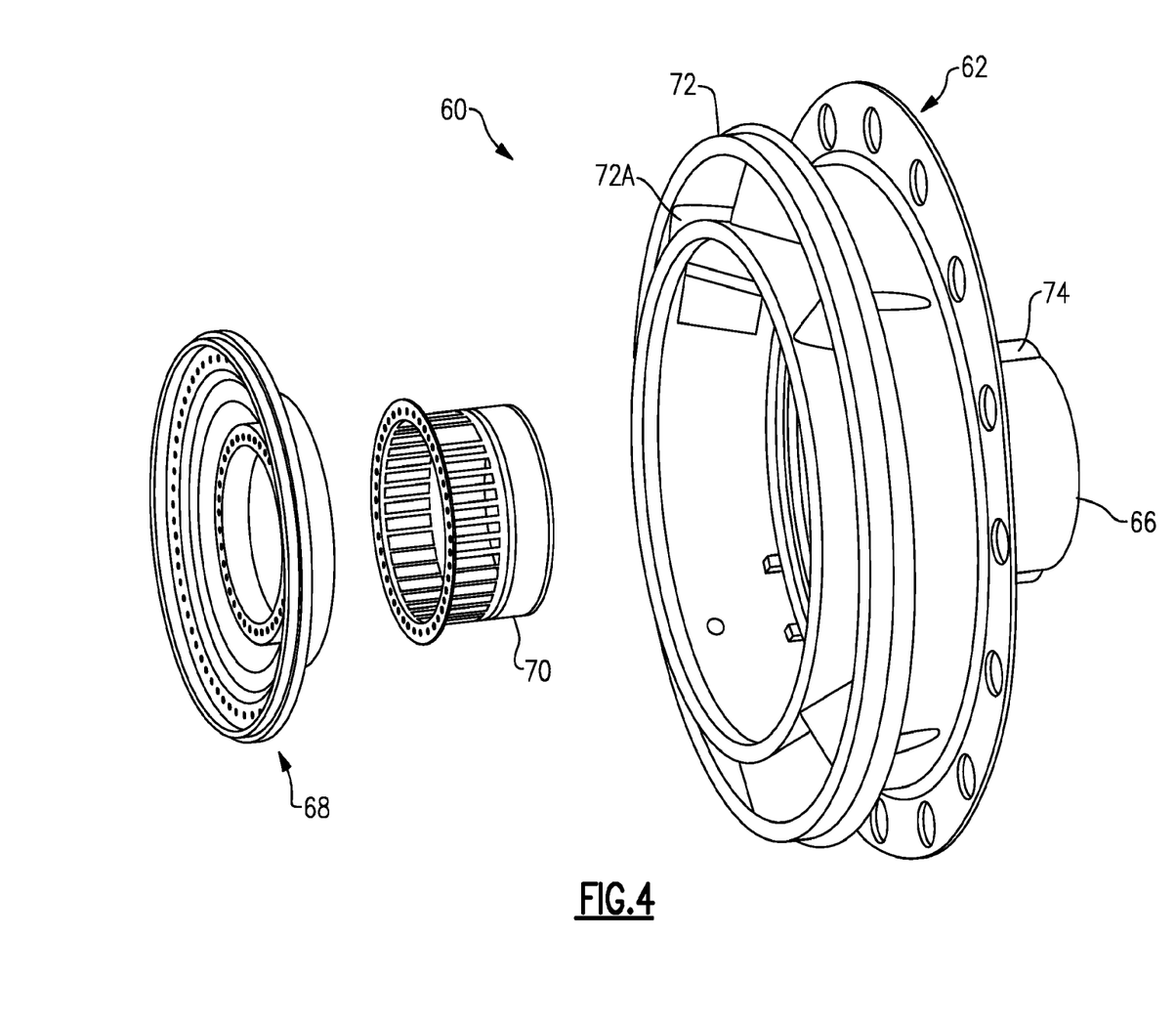
FIG. 4 is an exploded perspective view of a front center body assembly.

With reference to FIG. 3, the flex support 68 provides a flexible attachment of the geared architecture 48 within the front center body support 62 (also illustrated in FIG. 4). The flex support 68 reacts the torsional loads from the geared architecture 48 and facilitates vibration absorption as well as other support functions. The centering spring 70 is a generally cylindrical cage-like structural component with a multiple of beams which extend between flange end structures (also illustrated in FIG. 4). The centering spring 70 resiliently positions the bearing package 66 with respect to the low spool 30. In one embodiment, the beams are double-tapered beams arrayed circumferentially to control a radial spring rate that may be selected based on a plurality of considerations including, but not limited to, bearing loading, bearing life, rotor dynamics, and rotor deflection considerations.

Figure 5:
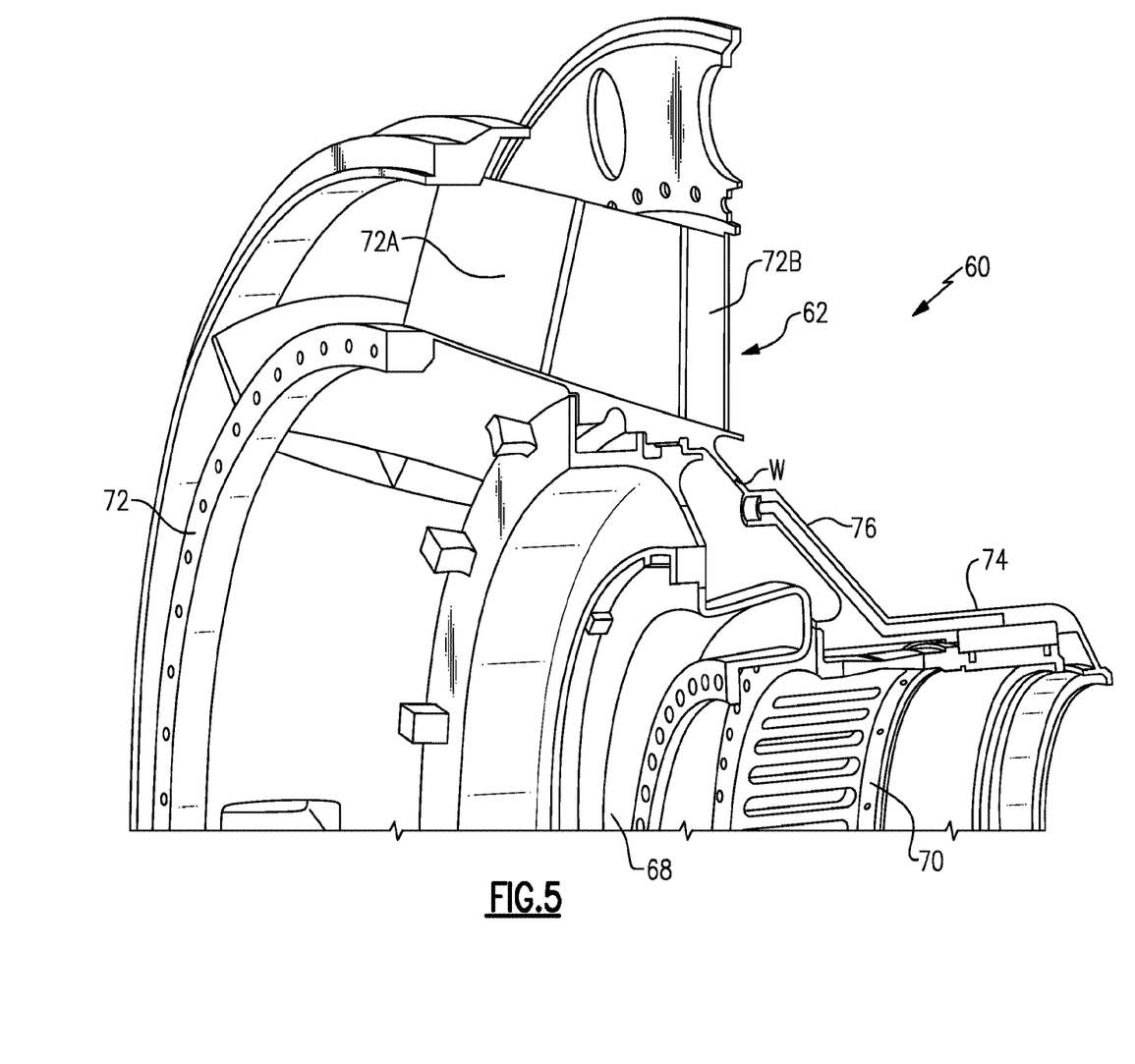
FIG. 5 is an enlarged perspective partial cross-section of a front center body support of the front center body assembly.

The front center body support 62 includes a front center body section 72 and a bearing section 74 defined about axis A with a frustro-conical interface section 76 therebetween (FIG. 5). The front center body section 72 at least partially defines the core flowpath into the low pressure compressor 44. The front center body section 72 includes an annular core passage with a multiple of front center body vanes 72A, 72B. The bearing section 74 is defined radially inward of the front center body section 72. The bearing section 74 locates the bearing package 66 and the seal package 64 with respect to the low spool 30. The frustro-conical interface section 76 combines the front center body section 72 and the bearing section 74 to form a unified load path, substantially free of kinks typical of a conventional flange joint, from the bearing package 66 to the outer periphery of the engine static structure 36. The frustro-conical interface section 76 may include a weld W (FIG. 5) or, alternatively, be an integral section such that the front center body support 62 is a unitary component.

The integral, flange-less arrangement of the frustro-conical interface section 76 facilitates a light weight, reduced part count architecture with an increased ability to tune the overall stiffness and achieve rotor dynamic requirements. Such an architecture also further integrates functions such as oil and air delivery within the bearing compartment which surrounds bearing package 66.

Figure 6:
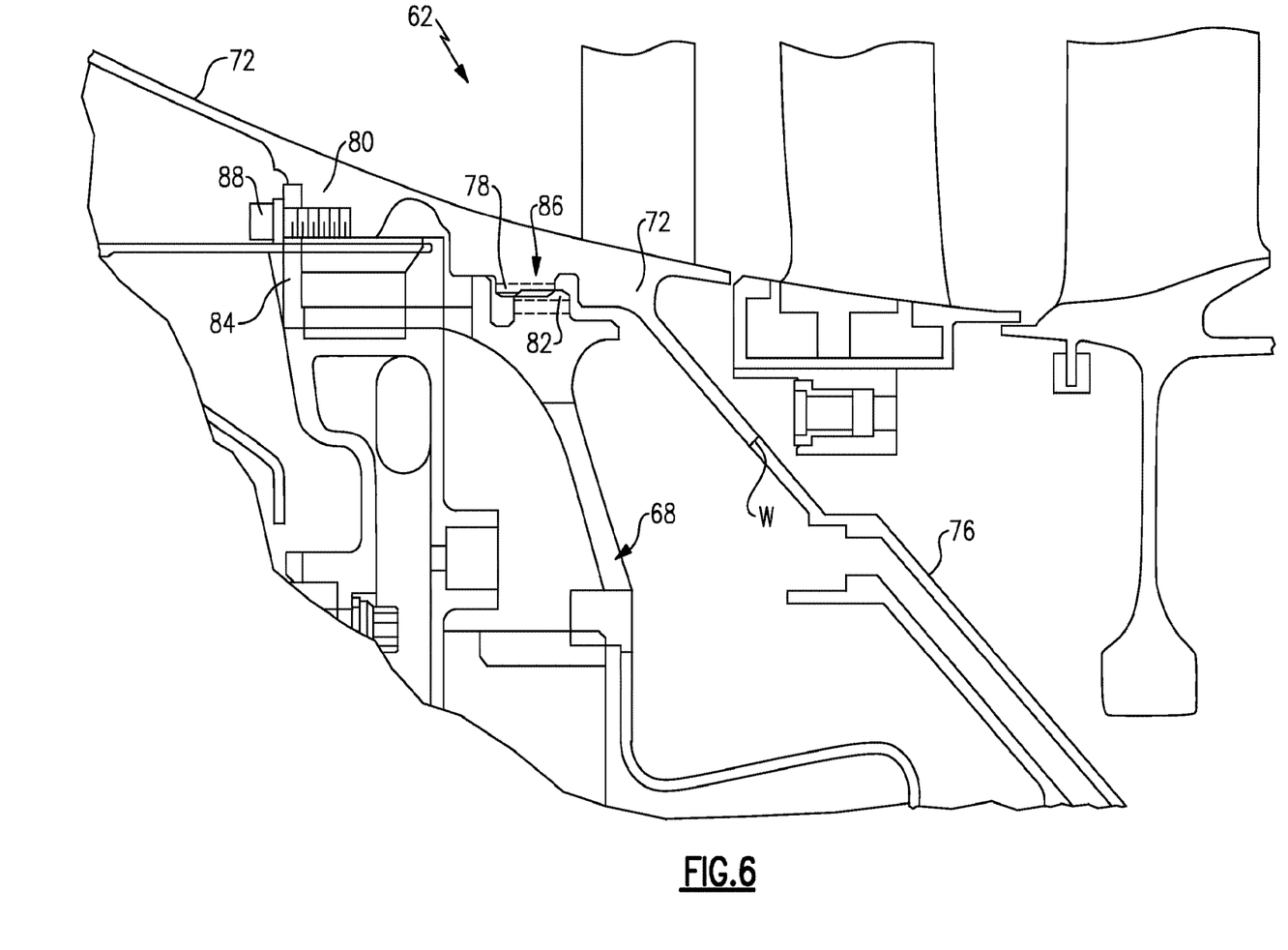
FIG. 6 is an enlarged sectional view of the front center body support.

With reference to FIG. 6, the front center body support 62 includes mount features to receive the flex support 68. In one disclosed non-limiting embodiment, the mount features of the front center body support 62 includes an internal spline 78 and a radial inward directed fastener flange 80 on the front center body section 72. The flex support 68 includes a corresponding outer spline 82 and radially outwardly directed fastener flange 84. The flex support 68 is received into the front center body support 62 at a splined interface 86 formed by splines 78, 82 and retained therein such that fastener flange 84 abuts fastener flange 80. A set of fasteners 88 such as bolts are threaded into the fastener flanges 80, 84 to mount the flex support 68 within the front center body support 62.

Figure 7:
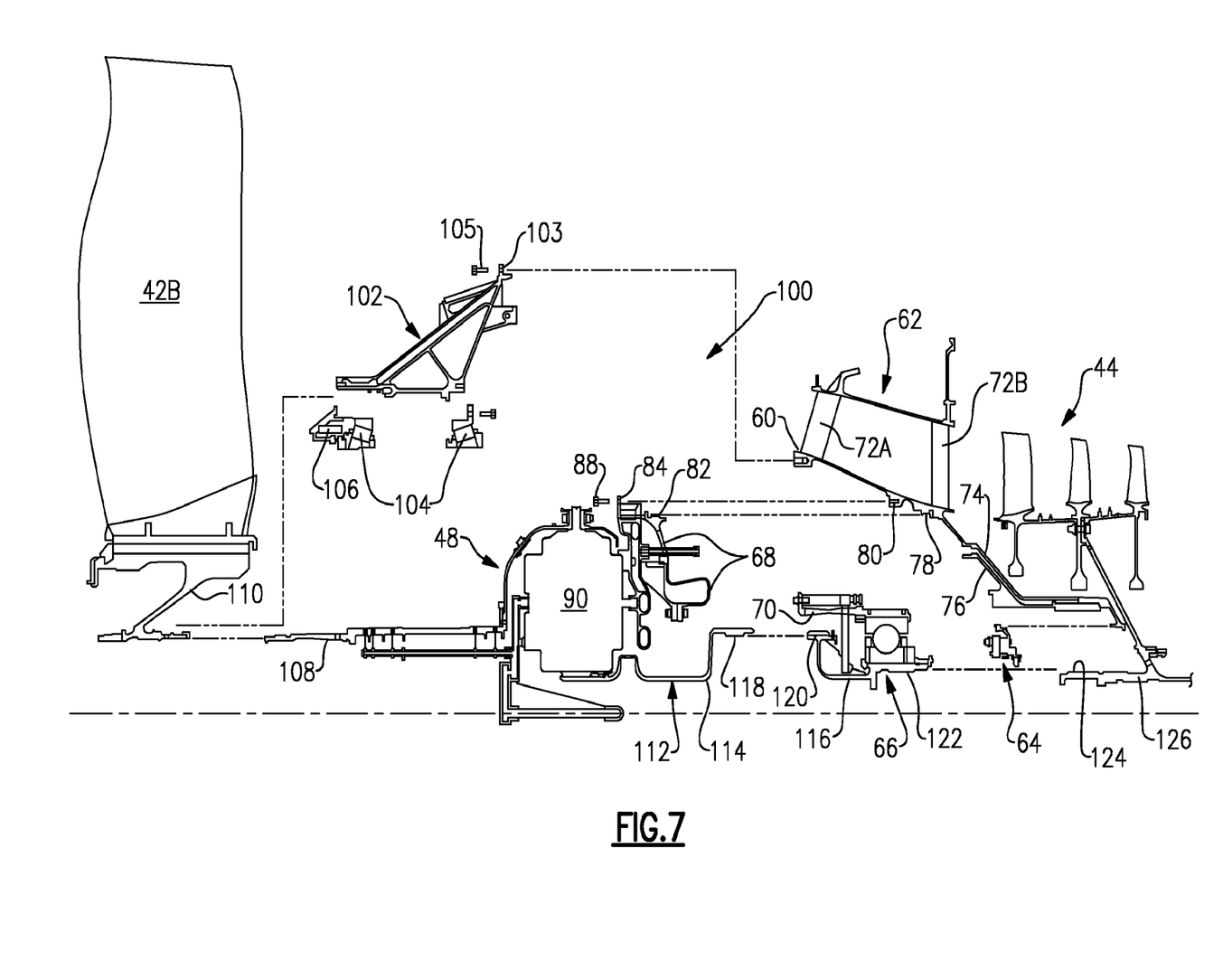
FIG. 7 is an exploded view of the front center body support.

With reference to FIG. 7, the fasteners 88 are directed forward to provide access from a forward section of the front center body assembly 60 opposite the bearing package 66 of the number two bearing system 38A. The fasteners 88 are thereby readily removed to access a gearbox 90 of the geared architecture 48.

A front wall 102 aft of the fan 42 is mounted to a forward section of the front center body support 62 to provide access to the geared architecture 48 from the front of the engine 20. The front wall 102 includes a flange 103 mountable to the front center body support 62 at the flange 60 by a multiple of fasteners 105, which fasteners 105 may in one non-limiting embodiment be bolts. The front wall 102 and the front center body support 62 define a bearing compartment 100 (also shown in FIG. 2) which mounts to the bearing package 66. The front wall 102 is removable such that the gearbox 90 may be accessed as a module. The gearbox 90 may thereby be accessed to facilitate rapid on-wing service.

It should be appreciated that various bearing structures 104 (illustrated schematically and in FIG. 2) and seals 106 (illustrated schematically and in FIG. 2) may be supported by the front wall 102 to contain oil and support rotation of an output shaft 108. The output shaft 108 connects with the geared architecture 48 to drive the fan 42. Fan blades 42B extend from a fan hub 110 which are mounted to the output shaft 108 for rotation therewith. It should be appreciated that the bearing structures 104 and seals 106 may, in the disclosed non-limiting embodiment may be disassembled with the front wall 102 as a unit after removal of the fan hub 110.

The gearbox 90 is driven by the low spool 30 (FIG. 1) through a coupling shaft 112. The coupling shaft 112 transfers torque through the bearing package 66 to the gearbox 90 as well as facilitates the segregation of vibrations and other transients. The coupling shaft 112 generally includes a forward coupling shaft section 114 and an aft coupling shaft section 116 which extends from the bearing package 66. The forward coupling shaft section 114 includes an interface spline 118 which mates with an aft spline 120 of the aft coupling shaft section 116. An interface spline 122 of the aft coupling shaft section 116 connects the coupling shaft 112 to the low spool 30 through, in this non limiting embodiment, splined engagement with a spline 124 on a low pressure compressor hub 126 of the low pressure compressor 44.

Figure 8:
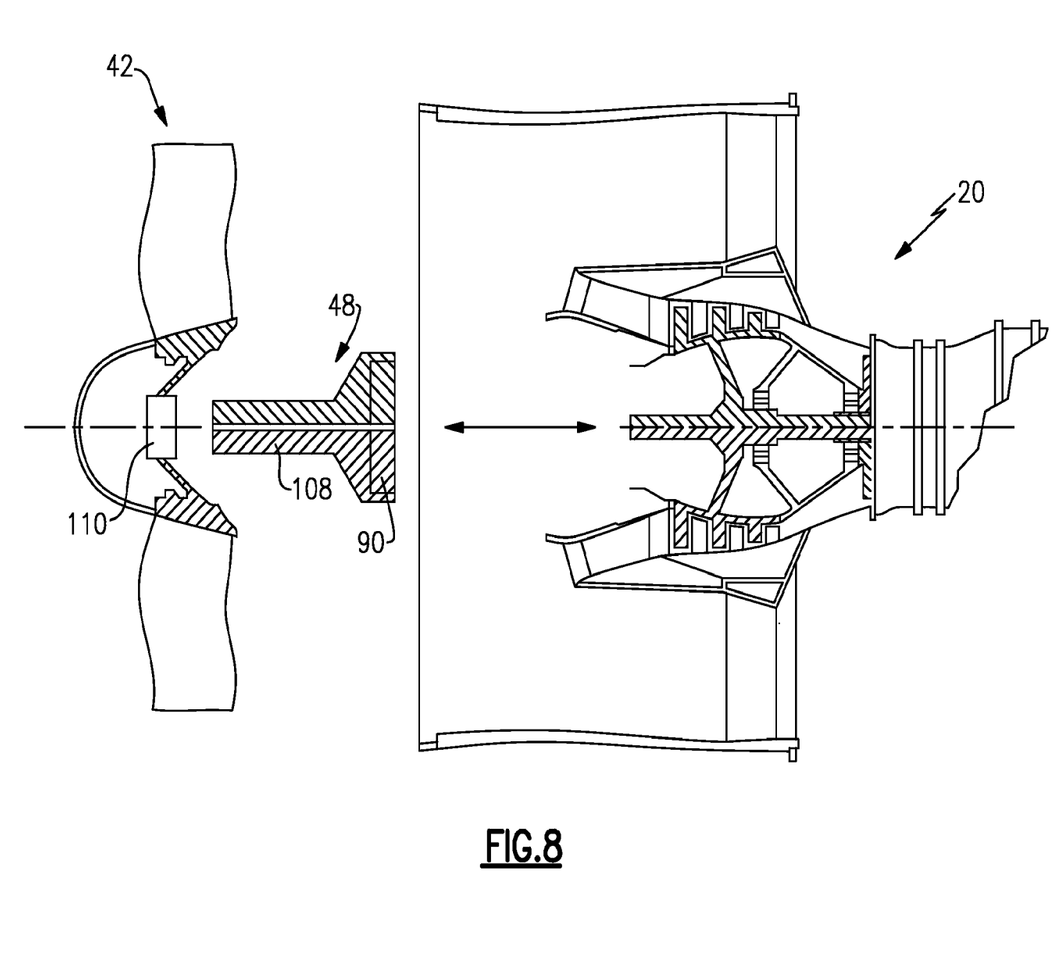
FIG. 8 is a schematic view of a forward gearbox removal from the gas turbine engine.

To remove the gearbox 90, the fan hub 110 is disassembled from the output shaft 108. The multiple of fasteners 105 are then removed such that the front wall 102 is disconnected from the front center body support 62. The multiple of fasteners 88 are then removed from the front of the engine 20. The geared architecture 48 is then slid forward out of the front center body support 62 such that the interface spline 118 is slid off the aft spline 120 and the outer spline 82 is slid off the internal spline 78. The geared architecture 48 is thereby removable from the engine 20 as a module (FIG. 8; illustrated schematically). It should be appreciated that other componentry may need to be disassembled to remove the geared architecture 48 from the engine 20, however, such disassembly is relatively minor and need not be discussed in detail. It should be further appreciated that other components such as the bearing package 66 and seal 64 are also now readily accessible from the front of the engine 20.

Removal of the gearbox 90 from the front of the engine 20 as disclosed saves significant time and expense. The geared architecture 48, is removable from the engine 20 as a module and does not need to be further disassembled. Moreover, although the geared architecture 48 must be removed from the engine to gain access to the bearing package 66 and the seal 64, the geared architecture 48 does not need to be removed from the engine 20 to gain access to the engine core itself. Further, as one would appreciate from the above, in an example where a portion of the geared architecture 48 itself requires service, the bearing package 66 can remain in place to support the low spool 30, and in turn a low rotor, of the gas turbine engine 20 while the geared architecture 48 is removed for service.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine comprising:
   a fan having fan blades wherein the fan delivers airflow to a bypass duct;
   a gearbox defined along an engine axis;
   a low spool arranged aft of said gearbox and coupled to drive said gearbox:
   a front center body assembly defined around said engine axis, wherein said front center body assembly defines a portion of a core flow through the gas turbine engine and an outlet of the portion of a core flow path is upstream of an inlet to a low pressure compressor;
   a flexible support supporting said gearbox relative to said front center body assembly;
   a bearing package mounted to said front center body assembly and said low spool;
   a front wall mounted to said front center body assembly, said front wall removable from said front center body assembly to access at least one of said gearbox or said bearing package; and
   wherein said low spool includes a low pressure compressor hub providing a spline for engaging said bearing package.

2. The gas turbine engine of claim 1, wherein said flexible support is retained relative to said front center body assembly with a plurality of fasteners.

3. The gas turbine engine of claim 2, wherein said flexible support engages said front center body assembly with a splined connection.

4. The gas turbine engine of claim 3, further comprising a centering spring for positioning said bearing package with respect to said low spool.

5. The gas turbine engine of claim 1, further comprising a seal package located aft of said bearing package.

6. The gas turbine engine of claim 5, wherein said seal package is mounted to said front center body assembly.

7. The gas turbine engine of claim 6, wherein said seal package is mounted to said low pressure compressor hub.

8. The gas turbine engine of claim 7, wherein said bearing package includes a coupling shaft section.

9. The gas turbine engine of claim 8, further comprising a coupling shaft interconnecting and splined to each of said gearbox and said coupling shaft section.

10. The gas turbine engine of claim 9, wherein said coupling shaft facilitates segregation of vibrations.

11. The gas turbine engine of claim 1, further comprising a centering spring for positioning said bearing package with respect to said low spool.

12. The gas turbine engine of claim 11, wherein said centering spring includes multiple beams that extend between flange end structures for positioning said bearing package with respect to said low spool.

13. The gas turbine engine of claim 1, wherein said front center body assembly includes a flange which abuts a flange of said front wall.

14. The gas turbine engine of claim 13, further comprising a plurality of fasteners which attach said flange of said front wall to said flange of said front center body assembly.

15. The gas turbine engine of claim 14, wherein said fasteners are accessible from a forward side of said gas turbine engine.

16. The gas turbine engine of claim 1, wherein said front wall supports a bearing structure to support an output shaft driven by said gearbox, and wherein said output shaft drives the fan.

17. The gas turbine engine of claim 1, wherein said gearbox and said bearing package engage a coupling shaft.

18. The gas turbine engine as recited in claim 1, wherein said front center body assembly provides a unitary component with a front center body section having a vane arranged in an annular core path and that at least partially defines the core flow path.

19. The gas turbine engine of claim 1, wherein said front center body assembly includes a front center body support and a front center body section that are integral with one another and said front center body section includes a vane arranged in an annular core path and that at least partially defines the core flow path.

20. The gas turbine engine of claim 19, wherein said front center body assembly and said front center body section are welded to one another.

21. A gas turbine engine comprising:
- a fan having fan blades wherein the fan delivers airflow to a bypass duct;
- a gearbox defined along an engine axis;
- a low spool arranged aft of said gearbox and coupled to drive said gearbox:
- a front center body assembly defined around said engine axis, wherein said front center body assembly defines a portion of a core flow through the gas turbine engine and an outlet of the portion of a core flow path is upstream of an inlet to a low pressure compressor;
- a flexible support supporting said gearbox relative to said front center body assembly;
- a bearing package mounted to said front center body assembly and said low spool;
- a front wall mounted to said front center body assembly, said front wall removable from said front center body assembly to access at least one of said gearbox or said bearing package;
- a coupling shaft interconnecting and splined to each of said gearbox and a coupling shaft section; and
- wherein said low spool includes a low pressure compressor hub providing a spline for engaging said bearing package.

22. The gas turbine engine of claim 21, further comprising a seal package is-located aft of said bearing package.

23. The gas turbine engine of claim 22, wherein said seal package is mounted to said front center body assembly and to said low pressure compressor hub.

24. The gas turbine engine of claim 22, wherein said flexible support engages said front center body assembly with a splined connection.

25. The gas turbine engine of claim 24, wherein said flexible support is retained relative to said front center body assembly with a plurality of fasteners.

26. The gas turbine engine of claim 25, wherein said bearing package includes said coupling shaft section and said coupling shaft facilitates segregation of vibrations.

27. The gas turbine engine of claim 26, further comprising a centering spring for positioning said bearing package with respect to said low spool.

28. The gas turbine engine of claim 27, wherein said centering spring includes multiple beams that extend between flange end structures for positioning said bearing package with respect to said low spool.

29. The gas turbine engine of claim 21, wherein said front wall supports a bearing structure to support an output shaft driven by said gearbox, and wherein said output shaft drives the fan.

30. The gas turbine engine of claim 21, wherein said front center body assembly includes a front center body support that provides a unitary component with a front center body section having a vane arranged in an annular core path and that at least partially defines the core flow path.

* * * * *